US012749403B2

(12) United States Patent
Hatori et al.

(10) Patent No.: US 12,749,403 B2
(45) Date of Patent: *Sep. 29, 2026

(54) IN-VEHICLE DEVICE, CONTROL METHOD, AND RECORDING MEDIUM

(71) Applicant: TOYOTA JIDOSHA KABUSHIKI KAISHA, Toyota (JP)

(72) Inventors: Takayuki Hatori, Nagakute (JP); Takuma Katoh, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/938,594

(22) Filed: Nov. 6, 2024

(65) Prior Publication Data

US 2025/0061809 A1 Feb. 20, 2025

Related U.S. Application Data

(63) Continuation of application No. 17/895,183, filed on Aug. 25, 2022, now Pat. No. 12,165,517.

(30) Foreign Application Priority Data

Sep. 16, 2021 (JP) ................................ 2021-151535

(51) Int. Cl.
*G08G 1/16* (2006.01)
*B60Q 9/00* (2006.01)
(Continued)

(52) U.S. Cl.
CPC ............... *G08G 1/166* (2013.01); *B60Q 9/00* (2013.01); *B60R 16/03* (2013.01); *G06F 3/14* (2013.01); *H04R 3/00* (2013.01); *H04R 2499/13* (2013.01)

(58) Field of Classification Search
CPC .......... G08G 1/166; B60Q 9/00; B60R 16/03; G06F 3/14; H04R 3/00; H04R 2499/13
See application file for complete search history.

(56) References Cited

U.S. PATENT DOCUMENTS 9,368,986 B1 * 6/2016 Juma ..................... H02J 7/0042
9,656,605 B1 5/2017 Lee
(Continued)

FOREIGN PATENT DOCUMENTS

CN 103322179 A * 9/2013 ............ B60W 10/11
CN 111284405 A 6/2020
(Continued)

OTHER PUBLICATIONS

Office Action mailed Apr. 25, 2024 in co-pending U.S. Appl. No. 17/895,183, 13 pages.
(Continued)

*Primary Examiner* — Chico A Foxx
(74) *Attorney, Agent, or Firm* — Oblon, McClelland, Maier & Neustadt, L.L.P.

(57) ABSTRACT

An in-vehicle device to be mounted on a vehicle including an audio output device configured to output audio and an image output device configured to output an image supplies power to the audio output device during a first period from when a trigger of a passenger getting on the vehicle is detected until when first operation of powering on a power supply of the vehicle is performed, and supplies power to the audio output device and the image output device during a second period from when second operation of shutting down the power supply of the vehicle is performed until when the passenger getting off the vehicle is detected.

20 Claims, 9 Drawing Sheets

(51) Int. Cl.

| | |
|---|---|
| ***B60R 16/03*** | (2006.01) |
| ***G06F 3/14*** | (2006.01) |
| ***H04R 3/00*** | (2006.01) |

(56) References Cited

U.S. PATENT DOCUMENTS

| | | | | |
|---|---|---|---|---|
| 9,741,224 | B1 * | 8/2017 | Singh | H04B 1/3816 |
| 9,975,379 | B1 | 5/2018 | Gowda | |
| 2003/0160510 | A1 | 8/2003 | Mizutani | |
| 2004/0225417 | A1 | 11/2004 | Sano | |
| 2005/0057350 | A1 | 3/2005 | Younse | |
| 2010/0120581 | A1 | 5/2010 | Mitsutani | |
| 2012/0235568 | A1 | 9/2012 | Prodin | |
| 2014/0045531 | A1 * | 2/2014 | Kessoku | H04W 4/021 455/456.2 |
| 2017/0011561 | A1 | 1/2017 | Makke et al. | |
| 2017/0021763 | A1 | 1/2017 | Melaragni | |
| 2017/0106789 | A1 * | 4/2017 | Holdbrook-Smith | B60Q 9/00 |
| 2017/0240110 | A1 * | 8/2017 | Lopez-Hinojosa | B60Q 9/00 |
| 2017/0253216 | A1 | 9/2017 | Nishidat et al. | |
| 2017/0263062 | A1 | 9/2017 | Bergerhoff et al. | |
| 2019/0194982 | A1 | 6/2019 | Kim | |
| 2019/0263320 | A1 | 8/2019 | Onodera | |
| 2020/0290510 | A1 | 9/2020 | Ohara | |
| 2022/0266799 | A1 | 8/2022 | Yamada | |
| 2022/0268065 | A1 | 8/2022 | Kato | |
| 2022/0332247 | A1 | 10/2022 | Kim | |
| 2022/0371527 | A1 * | 11/2022 | Sato | B60R 11/0217 |

FOREIGN PATENT DOCUMENTS

| | | | | | |
|---|---|---|---|---|---|
| EP | 1612408 | A1 | | 1/2006 | |
| JP | 2002-225560 | A | | 8/2002 | |
| JP | 2005-268933 | A | | 9/2005 | |
| JP | 2005-318691 | A | | 11/2005 | |
| JP | 4509215 | B2 | * | 7/2010 | G01C 21/10 |
| JP | 2012-116348 | A | | 6/2012 | |
| JP | 2014-142360 | A | | 8/2014 | |
| JP | 2017-154669 | A | | 9/2017 | |
| JP | 2020-93567 | A | | 6/2020 | |
| JP | 2021-77953 | A | | 5/2021 | |
| JP | 2023-043752 | A | | 3/2023 | |
| KR | 102886536 | B1 | * | 11/2025 | H04W 4/40 |
| NO | 316197 | B1 | * | 12/2003 | |
| WO | WO-2008142775 | A1 | * | 11/2008 | G01C 21/00 |

OTHER PUBLICATIONS

Notice of Allowance mailed Aug. 7, 2024 in co-pending U.S. Appl. No. 17/895,183, 9 pages.

* cited by examiner

FIG. 6

| | | FUNCTION/COMPONENT TO WHICH POWER IS SUPPLIED | | | | | | | |
|---|---|---|---|---|---|---|---|---|---|
| | | MEMORY BACK-UP | CAN COMMUNICATION | MAIN SUBSTRATE | WIRELESS COMMUNICATION MODULE | AUDIO OUTPUT DEVICE | IMAGE OUTPUT DEVICE | AUDIO INPUT DEVICE | OUTSIDE CAMERA |
| POWER SUPPLY MODE | PARKING MODE | ○ | ○ | - | - | - | - | - | - |
| | GETTING-ON MODE | ○ | ○ | ○ | ○ | ○ | - | - | - |
| | GETTING-OFF MODE | ○ | ○ | ○ | ○ | ○ | ○ | - | - |
| | NORMAL MODE (ACC) | ○ | ○ | ○ | ○ | ○ | ○ | ○ | - |
| | NORMAL MODE (IG) | ○ | ○ | ○ | ○ | ○ | ○ | ○ | ○ |

IN-VEHICLE DEVICE, CONTROL METHOD, AND RECORDING MEDIUM

CROSS REFERENCE TO RELATED APPLICATION

This application is a continuation of U.S. patent application Ser. No. 17/895,183, filed on Aug. 25, 2022, which claims the benefit of Japanese Patent Application No. 2021-151535, filed on Sep. 16, 2021, which is hereby incorporated by reference herein in its entirety.

BACKGROUND

Technical Field

The present disclosure relates to power supply control of a vehicle.

Description of the Related Art

In accordance with increase in the number of pieces of electronic equipment mounted on a vehicle, reduction in power consumption becomes an issue. For example, Japanese Patent Laid-Open No. 2014-142360 discloses a car navigation device on which a display for displaying an image and an amplifier for outputting audio are mounted.

The present disclosure is directed to reducing power consumption in a vehicle.

SUMMARY

One aspect of an embodiment of the present disclosure is an in-vehicle device to be mounted on a vehicle including an audio output device configured to output audio and an image output device configured to output an image, in which the in-vehicle device supplies power to the audio output device during a first period from when a trigger of a passenger getting on the vehicle is detected until when first operation of powering on a power supply of the vehicle is performed, and supplies power to the audio output device and the image output device during a second period from when second operation of shutting down the power supply of the vehicle is performed until when the passenger getting off the vehicle is detected.

One aspect of an embodiment of the present disclosure is a control method for controlling a vehicle including an audio output device configured to output audio and an image output device configured to output an image, the control method including supplying power to the audio output device during a first period from when a trigger of a passenger getting on the vehicle is detected until when first operation of powering on a power supply of the vehicle is performed, and supplying power to the audio output device and the image output device during a second period from when second operation of shutting down the power supply of the vehicle is performed until when the passenger getting off the vehicle is detected.

Further, another aspect includes a program for causing a computer to execute the control method described above or a computer-readable storage medium in which the program is non-transitory stored.

According to the present disclosure, it is possible to reduce power consumption in a vehicle.

BRIEF DESCRIPTION OF DRAWINGS

FIGS. 4A and 4B are diagrams for explaining transition of a power supply mode upon getting-on;

FIG. 6 is a diagram for explaining components to which power is supplied in each power supply mode;

FIG. 8 is a processing flowchart of an in-vehicle device upon getting-on.

DESCRIPTION OF THE EMBODIMENTS

Figure 1:
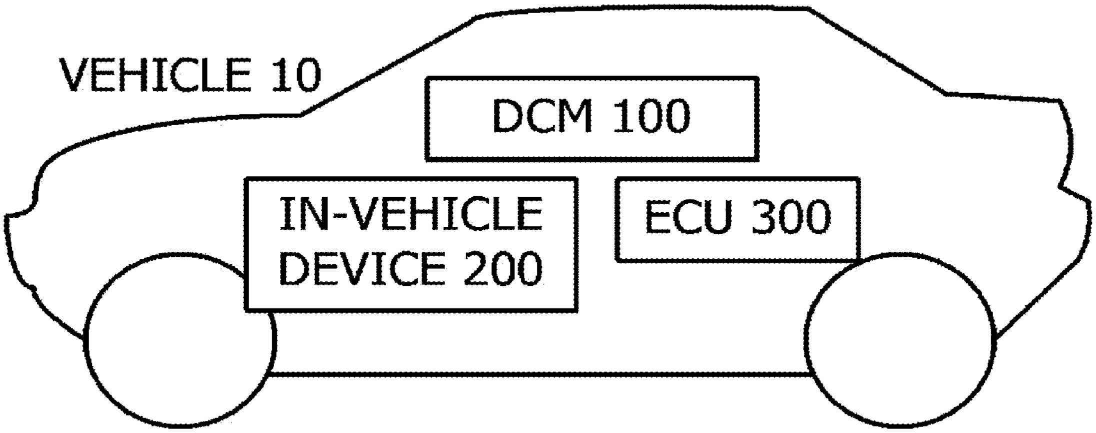
FIG. 1 is a schematic diagram of a vehicle system according to a first embodiment.

In a typical automobile, three types of modes of a mode in which a power supply is shut down, a mode in which solely an accessory power supply is powered on, and a mode in which all power supplies are powered on are used as power supply modes. The accessory power supply is a power supply for activating peripheral equipment that is not directly related to traveling of a vehicle. Typically, these types of power supply are started in a case where operation (ignition operation) of starting a vehicle system is performed.

However, it is sometimes inconvenient to power on the power supply in coordination with starting of the vehicle system. For example, in a case where there is a vehicle component which takes time to start, there is a case where waiting time arises from when starting operation is performed until when the component becomes available. Further, in a case where the vehicle system is stopped, a function for supporting safety upon getting-off may be also stopped.

An in-vehicle device according to the present disclosure solves such problems.

An in-vehicle device according to one aspect of the present disclosure is an in-vehicle device to be mounted on a vehicle including an audio output device configured to output audio and an image output device configured to output an image. The in-vehicle device supplies power to the audio output device during a first period from when a trigger of a passenger getting on the vehicle is detected until when first operation of powering on a power supply of the vehicle is performed, and supplies power to the audio output device and the image output device during a second period from when second operation of shutting down the power supply of the vehicle is performed until when the passenger getting off the vehicle is detected.

The first period is a period from when the trigger of the passenger getting on the vehicle is detected until when the operation of powering on a power supply of the vehicle system is performed, that is, a period during which getting-on of the passenger is waited for. The power supply of the vehicle system may be a power supply for running accessories or may be a power supply for traveling.

The trigger of the passenger getting on the vehicle may occur, for example, in a case where a door of the vehicle is unlocked or in a case where the door of the vehicle is open. Further, the trigger may occur at a timing at which getting-on of the passenger is detected by a sensor.

During the first period, by supplying power to the audio output device, it is possible to start in advance a vehicle component such as an amplifier, which takes time to start.

The second period is a period from when the operation of shutting down the power supply of the vehicle system is performed until when the passenger getting off the vehicle is detected, that is, a period during which getting-off of the passenger is waited for. Whether or not the passenger has got off the vehicle may be determined, for example, on the basis of a locked state or an open state of the door of the vehicle. Further, whether or not the passenger has got off the vehicle may be determined also on the basis of a result of sensing the passenger.

During the second period, by continuing power supply to the audio output device and the image output device, it is possible to provide a function for securing safety upon getting-off. Such a function may include, for example, a function of detecting a vehicle that approaches from behind and issuing an alarm when the door is open.

Note that "power supply" is not limited to a form in which the in-vehicle device directly supplies power to a target device. For example, "power supply" also includes a form in which the in-vehicle device instructs a target device connected to a predetermined power line (for example, a battery line) to receive power supply from the power line (power is indirectly supplied).

Specific embodiments of the present disclosure will be described below on the basis of the drawings. A technical scope of the disclosure is not intended to be limited to hardware configurations, module configurations, functional components, and the like, described in the respective embodiments unless noted otherwise.

First Embodiment

Outline of a vehicle system according to a first embodiment will be described with reference to FIG. 1. The vehicle system according to the present embodiment includes a vehicle 10.

The vehicle 10 is a connected car having a function of communicating with an external network. The vehicle 10 includes a data communication module (DCM) 100, an in-vehicle device 200, and an electronic control unit (ECU) 300. Note that while FIG. 1 illustrates a single ECU 300, the vehicle 10 may include a plurality of ECUs 300.

The DCM 100 is a device that performs wireless communication with an external network. The DCM 100 functions as a gateway that connects components provided in the vehicle 10 (hereinafter, vehicle components) to the external network. For example, the DCM 100 provides access to the external network to the in-vehicle device 200 and the ECU 300 provided in the vehicle 10. This enables the in-vehicle device 200 and the ECU 300 to communicate with external devices connected to a network via the DCM 100.

The in-vehicle device 200 is a device (for example, a car navigation device) that provides information to a passenger of the vehicle. The in-vehicle device 200 is also referred to as a car navigation device, an infotainment device, or a head unit.

The in-vehicle device 200 allows navigation or entertainment to be provided to the passenger of the vehicle. The in-vehicle device 200 may download traffic information, road map data, music, a moving image, and the like, via the DCM 100.

Figure 2:
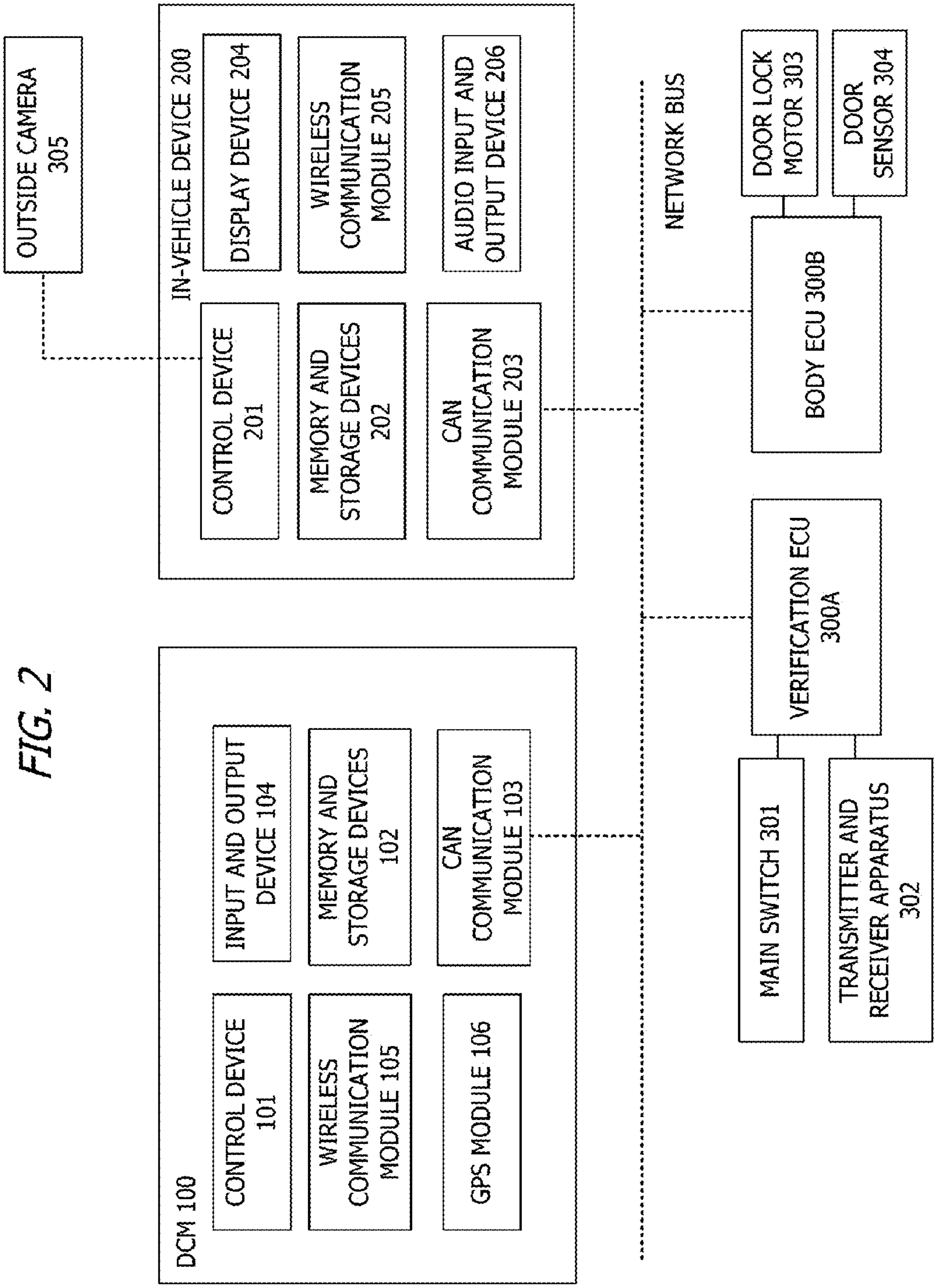
FIG. 2 is a diagram for explaining components provided in a vehicle according to the first embodiment.

FIG. 2 is a diagram for explaining components provided in the vehicle 10 according to the present embodiment. The vehicle 10 according to the present embodiment includes the DCM 100, the in-vehicle device 200, and a plurality of ECUs 300A, 300B, . . . (hereinafter, collectively referred to as the ECU 300).

The ECU 300 may include a plurality of ECUs that manage different vehicle components. Examples of the plurality of ECUs may include, for example, a body ECU, an engine ECU, a hybrid ECU, a power train ECU, and the like. Further, the ECU 300 may be divided in units of function. For example, the ECU 300 may be divided into an ECU that executes a security function, an ECU that executes an autonomous parking function, and an ECU that executes a remote control function.

In the present embodiment, as the ECU 300, a verification ECU 300A and a body ECU 300B are illustrated as examples. The verification ECU 300A is an ECU that manages security of the vehicle. The verification ECU 300A generates a signal that allows locking/unlocking of the vehicle and starting of the vehicle system by performing communication with a smart key (key fob) possessed by a user of the vehicle.

The body ECU 300B is an ECU that manages various kinds of components provided in a vehicle body. In the present embodiment, the body ECU 300B can lock/unlock a door of the vehicle 10 on the basis of the signal transmitted from the verification ECU 300A.

First, the DCM 100 will be described.

The DCM 100 includes a control device 101, a memory and storage devices 102, a CAN communication module 103, an input and output device 104, a wireless communication module 105, and a GPS module 106.

The control device 101 is an arithmetic unit that implements various kinds of functions of the DCM 100 by executing predetermined programs. The control device 101 may be implemented by, for example, a CPU, and the like.

The control device 101 executes a function of mediating communication to be performed between the external network and components provided in the vehicle 10 (vehicle components). For example, in a case where a certain vehicle component needs to communicate with the external network, the control device 101 executes a function of relaying data transmitted from the vehicle component to the external network. Further, the control device 101 executes a function of receiving data transmitted from the external network and transferring the data to an appropriate vehicle component.

Still further, the control device 101 can execute a function peculiar to the own device. For example, the control device 101 can execute a monitoring function and a call function of a security system and can issue a security notification, an emergency notification, or the like, on the basis of a trigger occurring inside the vehicle.

Here, functions to be executed by the control device 101 will be described. The control device 101 can execute functions that will be described below as examples. Each function can be implemented by the control device 101 executing a program stored in a storage device such as a ROM.

(1) Data Relay Function

The control device 101 can relay data to be transmitted and received between vehicle components. For example, the control device 101 executes processing of receiving a message transmitted by a first device connected to an in-vehicle network and forwarding the message to a second device connected to the in-vehicle network as needed. The first and the second devices may be ECUs 300 or may be other vehicle components.

Further, in a case where the control device 101 receives a message addressed to an external network, from a vehicle component, the control device 101 relays the message to the external network. Further, the control device 101 receives data transmitted from the external network and forwards the data to an appropriate vehicle component.

(2) Emergency Notification Function

The control device 101 can issue an emergency notification to an operator outside the vehicle in a case where an abnormal situation occurs in the vehicle 10. Examples of the abnormal situation includes occurrence of a traffic accident or a vehicle malfunction. For example, in a case where a predetermined trigger such as depression of a call button provided inside the vehicle and deployment of an airbag occurs, the control device 101 starts connection to the operator and enables call between the passenger of the vehicle and the operator. Note that upon emergency notification, the control device 101 may transmit position information of the vehicle to the operator. The position information of the vehicle may be acquired from the GPS module 106.

(3) Security Monitoring Function

The control device 101 can perform security monitoring processing. The control device 101 detects that the vehicle is unlocked without through approved procedure, for example, on the basis of data received from the ECU 300 that manages an electronic lock of the vehicle and transmits a security notification to a predetermined device. Note that the security notification may include position information of the vehicle. The position information of the vehicle may be acquired from the GPS module 106.

Note that while three types of functions are described as examples of functions to be provided by the DCM 100 here, the DCM 100 may provide functions other than these.

The memory and storage devices 102 includes a main memory and an auxiliary storage device. In the auxiliary storage device, an operating system (OS), various kinds of programs, various kinds of tables, and the like, are stored, and each function that matches a predetermined purpose as will be described later can be implemented by a program stored in the auxiliary storage device being loaded to the main memory and executed.

The CAN communication module 103 is an interface unit for connecting the DCM 100 to the in-vehicle network. In the present embodiment, a plurality of vehicle components including the in-vehicle device 200 and the ECU 300 are connected to each other via a bus of the in-vehicle network. An example of standards of the in-vehicle network is, for example, a controller area network (CAN). Note that in a case where the in-vehicle network utilizes a plurality of standards, the CAN communication module 103 may include a plurality of interface devices that match standards of communication destinations. Examples of communication standards other than CAN can include, for example, Ethernet (registered trademark), and the like.

The input and output device 104 is a unit that inputs and outputs information. Specifically, the input and output device 104 includes a help button to be depressed in a state of emergency, a microphone, a speaker, and the like.

The wireless communication module 105 includes an antenna for performing wireless communication and a communication module. The antenna is an antenna element that inputs and outputs a wireless signal. In the present embodiment, the antenna is compatible with mobile communication (for example, mobile communication such as 3G, LTE and 5G). Note that the antenna may include a plurality of physical antennas. For example, in a case where mobile communication utilizing a radio wave in a high frequency band such as a microwave and a millimeter wave is performed, a plurality of antennas may be arranged in a distributed manner to achieve stabilization of communication. The communication module is a module for performing mobile communication.

The GPS module 106 includes a GPS antenna for measuring position information and a positioning module. The GPS antenna is an antenna that receives a positioning signal transmitted from a positioning satellite (also referred to as a GNSS satellite). The positioning module is a module that calculates position information on the basis of the signal received by the GPS antenna.

Note that the DCM 100 may be able to operate independently of other components provided in the vehicle 10. For example, the DCM 100 may be able to operate alone without an external power supply by incorporating an auxiliary battery. Such a configuration enables an emergency notification, or the like, to be issued even in a case where a malfunction (such as, for example, a malfunction in power feeding) occurs in other components of the vehicle 10 due to a traffic accident, or the like.

The in-vehicle device 200 will be described next.

The in-vehicle device 200 is a device that provides information to a passenger of the vehicle 10 and is also referred to as a car navigation system, an infotainment system, or a head unit. The in-vehicle device 200 can provide navigation or entertainment to the passenger of the vehicle. Further, the in-vehicle device 200 may have a function of downloading traffic information, road map data, music, a moving image, or the like, by performing communication with an external network of the vehicle 10. Still further, the in-vehicle device 200 may be a device that coordinates with a smartphone, or the like.

Further, the in-vehicle device 200 also functions as a front-end of the DCM 100. For example, when the DCM 100 executes predetermined processing (for example, emergency notification), the in-vehicle device 200 inputs and outputs information related to the processing (for example, displays a calling status of the operator).

The in-vehicle device 200 may be a general-purpose computer. In other words, the in-vehicle device 200 may be a computer including a processor such as a CPU and a GPU, a main memory such as a RAM and a ROM, and an auxiliary storage device such as an EPROM, a hard disk drive and a removable medium. In the auxiliary storage device, an operating system (OS), various kinds of programs, various kinds of tables, and the like, are stored, and each function that matches a predetermined purpose as will be described later can be implemented by a program stored in the auxiliary storage device being executed. However, part or all of the functions may be implemented by a hardware circuit such as an ASIC and an FPGA.

The in-vehicle device 200 includes a control device 201, a memory and storage devices 202, a CAN communication module 203, a display device 204, a wireless communication module 205, and an audio input and output device 206.

The control device 201 is an arithmetic unit that implements various kinds of functions of the in-vehicle device 200 by executing predetermined programs. The control device 201 may be implemented by, for example, a CPU, and the like.

Figure 3:
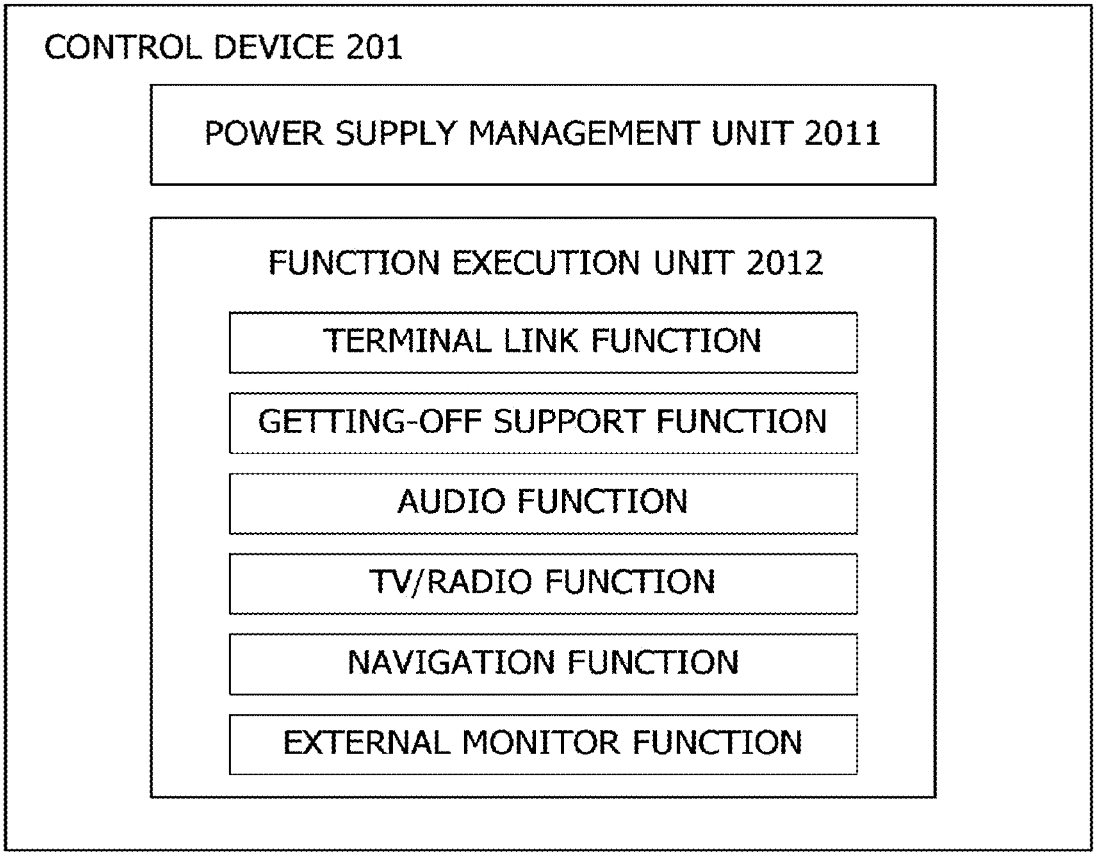
FIG. 3 is a schematic diagram for explaining functional modules provided at a control device 201.

FIG. 3 is a diagram illustrating a configuration of functional modules provided at the control device 201.

The control device 201 includes two functional modules of a power supply management unit 2011 and a function execution unit 2012. Each functional module may be implemented by the CPU executing a stored program.

The power supply management unit 2011 performs control regarding power supply.

Here, problems in related art and solutions in the present embodiment regarding power supply will be described. Note that in the following description, the accessory power supply refers to a power supply for causing peripheral equipment that are not directly related to traveling of the vehicle to operate. Power is supplied from the accessory power supply, for example, while an engine is stopped. Further, the ignition power supply refers to a power supply from which power is supplied while the vehicle is operating (for example, the engine is operating). Power is supplied from the respective power supplies through power lines of different systems.

Further, in the following description, the power supply mode is a mode for supplying power to a plurality of vehicle components. The power supply mode in the vehicle in related art includes the following three types.

1. Parking mode
2. Normal mode (ACC)
3. Normal mode (IG)

The parking mode is a power supply mode in a state where the vehicle is parked, that is, a traveling system of the vehicle is shut down, and the door is locked. In the parking mode, power is not supplied to vehicle components except vehicle components to which power needs to be always supplied (such as, for example, a DRAM for memory backup, a DCM for wireless communication, and a module that performs CAN communication).

The normal mode (ACC) is a power supply mode in which power is supplied solely from the accessory power supply. The mode can transition to the normal mode (ACC), for example, by a user of the vehicle performing predetermined operation.

The normal mode (IG) is a power supply mode in which power is supplied from both the accessory power supply and the ignition power supply. In a case where the vehicle 10 is traveling, the power supply mode becomes the normal mode.

Figure 4A:
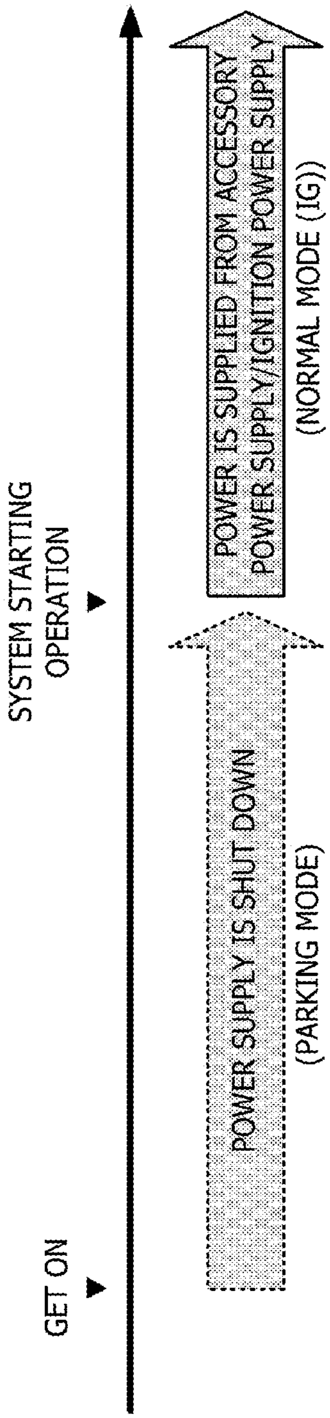

FIG. 4A is a diagram for explaining power supply control in the vehicle in related art. In the vehicle in related art, the power supply mode remains to be the parking mode from when the passenger gets on the vehicle until when the passenger performs operation of starting the vehicle system (such as, for example, ignition operation and operation of depressing a main switch). In other words, during this period, power is not supplied to most of the vehicle components.

However, in such a configuration, a case can occur where it is not possible to quickly provide a service from when the vehicle system is started. For example, it is known that it takes a certain amount of time for the in-vehicle device that provides an infotainment function and the audio output device including an amplifier to start. Particularly, it takes time until circuits and elements of an audio amplifier become stable.

Thus, in the present embodiment, a "power supply mode in which power is supplied solely to predetermined equipment in a case where it is detected that the passenger has got on the vehicle" is added, and the in-vehicle device 200 controls switching of the power supply mode. Such a power supply mode will be referred to as a "getting-on mode".

In the present embodiment, a power supply (power supply directly coupled to a battery. Hereinafter, a battery power supply) that can be utilized before the vehicle system is started is separately provided in the in-vehicle device 200 (and the vehicle components that operate in the added power supply mode). The in-vehicle device 200 can cause a predetermined vehicle component to operate (regardless of whether or not the vehicle system is started) using the battery power supply.

The in-vehicle device 200 includes a sub-substrate that operates by the battery power supply in addition to a main substrate that operates by the accessory power supply, and the power supply management unit 2011 can operate with low power by the sub-substrate.

Figure 4B:
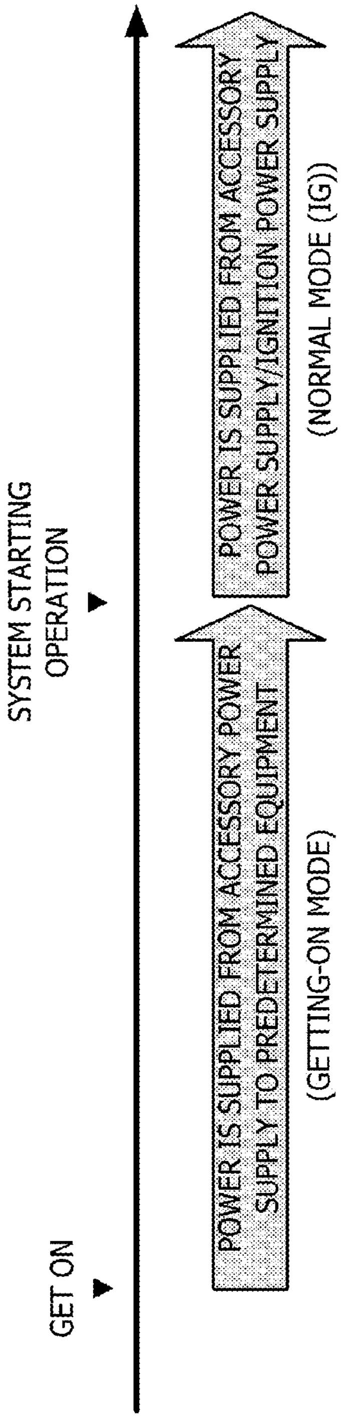

FIG. 4B is a diagram for explaining the getting-on mode. As illustrated, the in-vehicle device 200 (power supply management unit 2011) according to the present embodiment switches the power supply mode to the getting-on mode in a case where it is detected that the passenger has got on the vehicle 10. In the present embodiment, the getting-on mode is a mode in which power is supplied to three of the "main substrate of the in-vehicle device 200", the "wireless communication module" and the "audio output device" in addition to power supply targets in the parking mode. By switching the power supply mode to the getting-on mode, it is possible to start a main system of the in-vehicle device 200 in advance, prepare wireless communication (for example, connect to a smartphone) and start the audio output device (such as an amplifier). Note that in a case where operation of starting the vehicle system is performed, power is supplied from the accessory power supply and the ignition power supply as previously.

Figure 5A:
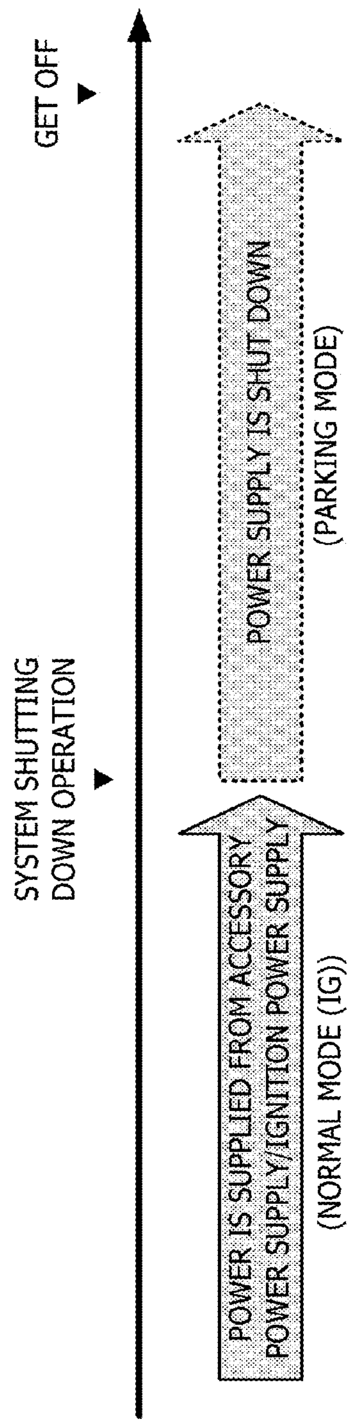
FIGS. 5A and 5B are diagrams for explaining transition of the power supply mode upon getting-off.

The problems described above may occur also when the passenger gets off the vehicle. FIG. 5A is a diagram for explaining the problems.

For example, if the passenger performs operation of shutting down the power supply of the vehicle system, the power supply mode transitions to the parking mode, and power supply to most of the vehicle components is stopped. It is therefore not possible to provide a function for supporting safety of the passenger, or the like, during a period from when the vehicle system is stopped until when getting-off of the passenger is completed. Examples of such a function includes, for example, a function of monitoring a vehicle that approaches from behind and outputting an alarm when the door is open (getting-off support function).

Thus, in the present embodiment, a "power supply mode in which power is supplied solely to predetermined equipment during a period from when operation of shutting down the power supply of the vehicle system is performed until when the passenger gets off the vehicle" is added, and the in-vehicle device 200 controls switching of the power supply mode. Such a power supply mode will be referred to as a "getting-off mode".

Figure 5B:
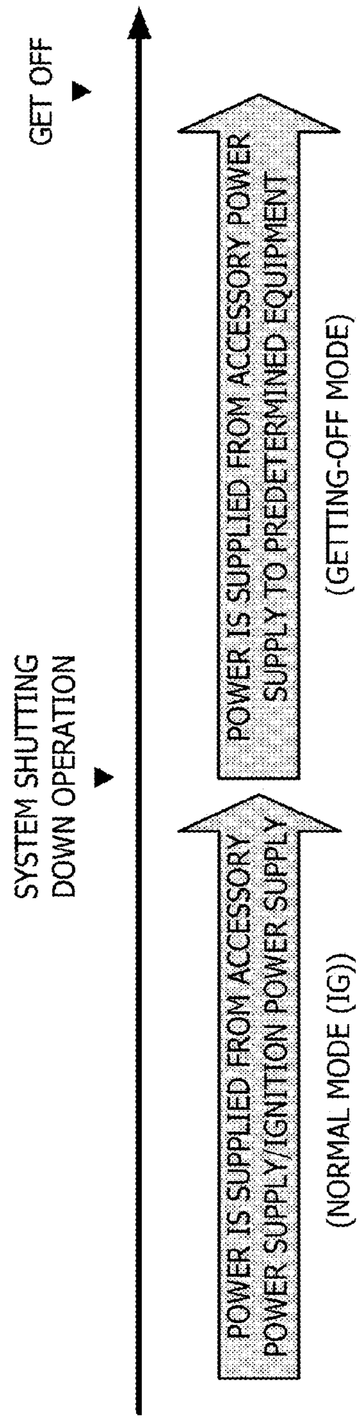

FIG. 5B is a diagram for explaining the getting-off mode. As illustrated, the in-vehicle device 200 (power supply management unit 2011) according to the present embodiment switches the power supply mode to the getting-off mode in a case where the passenger performs operation of shutting down the power supply of the vehicle system (operation of stopping the vehicle system). In the present embodiment, the getting-off mode is a mode in which power is supplied to the image output device in addition to power supply targets in the getting-on mode. In other words, in the getting-off mode, power is supplied to both the audio output device and the image output device. The getting-off mode continues until the passenger gets off the vehicle. The end of the getting-off mode may be set at, for example, a timing at which the door of the vehicle is open or a timing at which operation of locking the door of the vehicle is performed.

FIG. 6 indicates a table of vehicle components to which power is supplied in each power supply mode.

Returning to FIG. 3, description will be continued.

The function execution unit 2012 executes various kinds of functions to be provided by the in-vehicle device 200. Examples of the functions to be provided by the in-vehicle device 200 includes, for example, the following:

-Terminal Link Function

This function is a function of connecting to a terminal (such as a smartphone) possessed by the passenger of the vehicle and playing music and a moving image, mirroring a screen, or the like.

-Getting-Off Support Function

This function is a function of detecting another vehicle that approaches from behind the vehicle on the basis of sensor data outputted by the sensor provided in the vehicle 10 and outputting an alarm when the door is open. As the sensor, for example, a radar sensor, or the like, provided to face backward of the vehicle may be used.

-Audio Function

This function is a function of playing music stored in the storage device.

-TV/Radio Function

This function is a function of receiving radio broadcasting or digital TV broadcasting.

-Navigation Function

This function is a function of providing route navigation on the basis of map data stored in the storage device.

-External Monitor Function

This function is a function of outputting an image acquired from an outside camera 305 provided in the vehicle 10 to the display device and performing monitoring during parking, or the like.

These functions can be activated, for example, on the basis of operation with respect to the display device 204 (touch panel).

Returning to FIG. 2, description will be continued.

The memory and storage devices 202 are devices for storing information and includes memory medium and storage medium such as a RAM, a magnetic disk and a flash memory. In the memory and storage devices 202, various kinds of programs to be executed at the control device 201, data to be utilized by the programs, and the like, are stored.

The CAN communication module 203 is a communication interface that connects the in-vehicle device 200 to a bus of the in-vehicle network.

The display device 204 is a device for accepting input operation performed by the user and presenting information to the user. Specifically, the display device 204 includes a touch panel and a control device thereof, and a liquid crystal display and a control device thereof. The touch panel and the liquid crystal display form one touch panel display in the present embodiment.

Note that the image output device in the present disclosure may be the display device 204 or a display of the display device 204.

The wireless communication module 205 is a module that performs communication with a mobile terminal (such as a smartphone) possessed by the passenger of the vehicle. The wireless communication module 205 can perform communication by utilizing wireless communication standards such as, for example, Bluetooth (registered trademark) or Wi-Fi (registered trademark).

Figure 7:
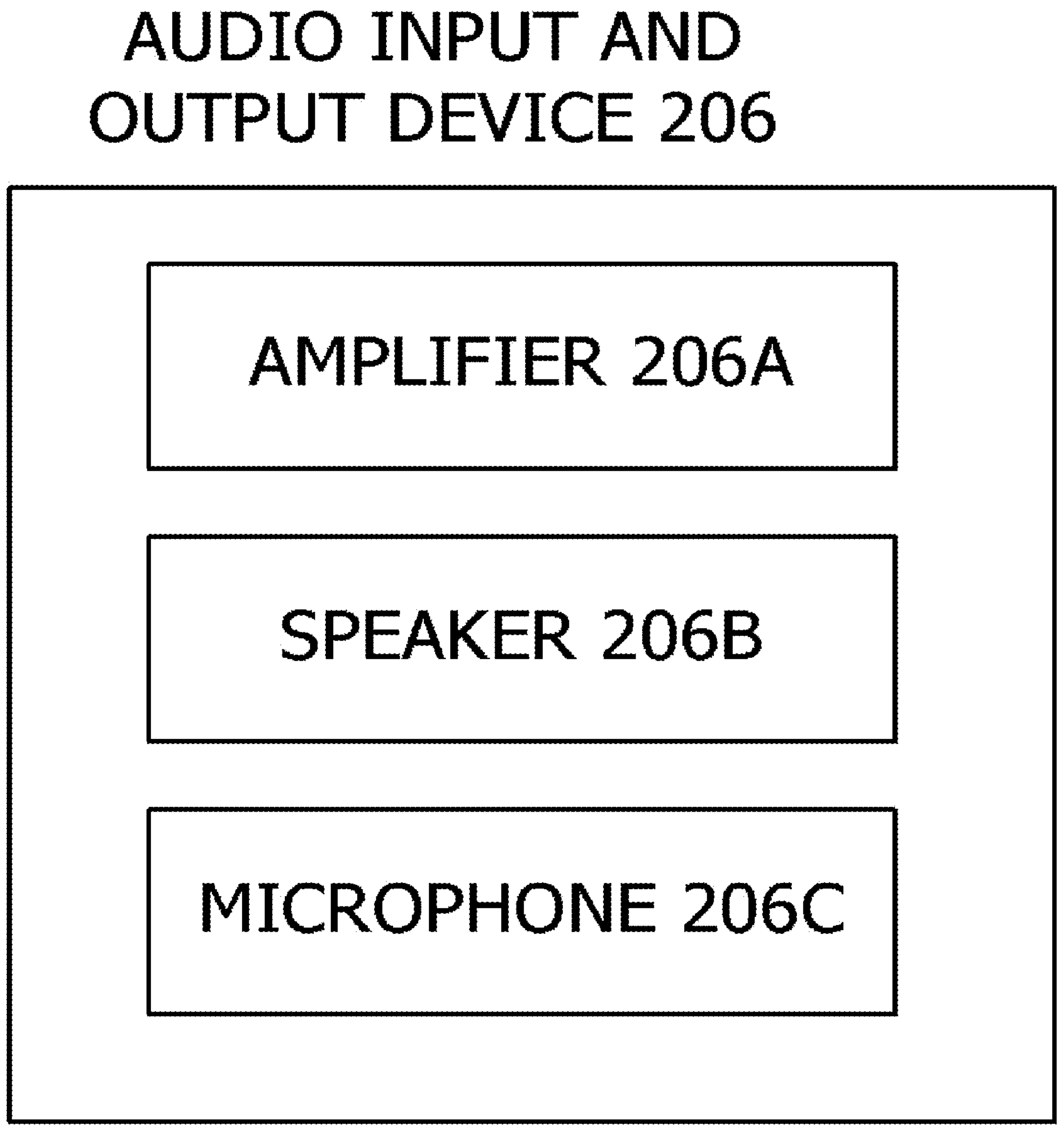
FIG. 7 is a diagram for explaining components provided at an audio input and output device 206.

The audio input and output device 206 is a unit for inputting and outputting audio. FIG. 7 is a diagram for explaining components provided at the audio input and output device 206. As illustrated, the audio input and output device 206 includes a unit that amplifies audio (amplifier 206A), a speaker 206B that outputs audio, a microphone 206C that inputs audio, and the like.

Note that the audio output device in the present disclosure may be the amplifier 206A, a combination of the amplifier 206A and the speaker 206B, or the like. Further, the audio input device in the present disclosure may be the microphone 206C.

The ECU 300 and peripheral components thereof will be described next.

The ECU 300 is an electronic control unit that controls components provided in the vehicle 10. The vehicle 10 may include a plurality of ECUs 300. The plurality of ECUs 300, for example, control components of different systems such as an engine system, an electrical system and a power train system. The ECU 300 has a function of generating a specified message and periodically transmitting and receiving the message via the in-vehicle network.

The ECU 300 may be a computer including a processor such as a CPU and a GPU, a main memory such as a RAM and a ROM, and an auxiliary storage device such as an EPROM, a disk drive and a removable medium in a similar manner to the DCM 100.

The vehicle 10 according to the present embodiment includes a verification ECU 300A and a body ECU 300B.

The body ECU 300B is a computer that controls a body of the vehicle. The body ECU 300B has a function of locking and unlocking the door of the vehicle by controlling a door lock motor 303 which will be described later. Note that the body ECU 300B may further include a function of controlling elements associated with a vehicle body, such as power window control, seat adjustment, theft prevention, seat belt control and head light control. Further, the body ECU 300B can acquire an open or closed state of the door of the vehicle 10 via a door sensor 304 which will be described later.

The door lock motor 303 is an actuator that locks and unlocks the door (including a trunk as well as doors for getting-on and getting-off and a rear gate) of the vehicle 10. The door lock motor 303 operates on the basis of a signal transmitted from the body ECU 300B.

The door sensor 304 is a sensor that senses open or closed states of a plurality of doors of the vehicle 10.

The verification ECU 300A performs communication with a smart key (key fob) possessed by the passenger of the vehicle and determines whether a person who has legitimate authority tries to get on the vehicle. A main switch 301 and a transmitting and receiving apparatus 302 are connected to the verification ECU 300A.

The main switch 301 is a hardware switch for starting the vehicle system and is typically a push switch. The main switch 301 is also referred to as an ignition switch.

The transmitting and receiving apparatus 302 includes a device for receiving a radio wave in a high frequency band (RF band) transmitted from the smart key and a device for transmitting a radio wave in a low frequency band (LF band) for searching for the smart key (performing polling). The RF band is, for example, a frequency from 100 MHZ to 1 GHZ. Further, the LF band is, for example, a frequency from 100 KHz to 300 KHz. The device for receiving a radio wave in the RF band is incorporated at any location within a vehicle interior. Further, the device for transmitting a radio wave in the LF band is, for example, incorporated in the vicinity of a center console or a steering within the vehicle interior.

In a case where the smart key transmits a signal for locking or unlocking the door of the vehicle (locking or unlocking signal), the verification ECU 300A receives the locking or unlocking signal via the transmitting and receiving apparatus 302 and performs authentication. Specifically, the verification ECU 300A determines whether or not a key ID included in the locking or unlocking signal matches a key ID stored in advance in the verification ECU 300A. In a case where authentication is successful, the verification ECU 300A transmits a signal for locking or unlocking the door to the body ECU 200B in accordance with the locking or unlocking signal.

Further, in a case where a locking or unlocking switch provided at the door of the vehicle 10 is depressed, the verification ECU 300A confirms existence of a key by performing polling via the transmitting and receiving apparatus 302 and performs authentication. In a case where authentication is successful, the verification ECU 300A transmits a signal for locking or unlocking the door to the body ECU 200B.

In a case where the main switch 301 is depressed, the verification ECU 300A confirms existence of a key by performing polling via the transmitting and receiving apparatus 302 and performs authentication. In a case where authentication is successful, the verification ECU 300A transmits a signal that gives an instruction to start the system to ECUs (such as an engine ECU and a hybrid ECU) that manages a traveling system. By this means, starting of a hybrid system, starting of the engine, and the like, are performed.

The network bus is a communication bus that constitutes the in-vehicle network. Note that while one bus is illustrated in this example, the vehicle 10 may include two or more communication buses. The plurality of communication buses may be connected to each other by the DCM 100 or a gateway that puts the plurality of communication buses together.

Figure 8:
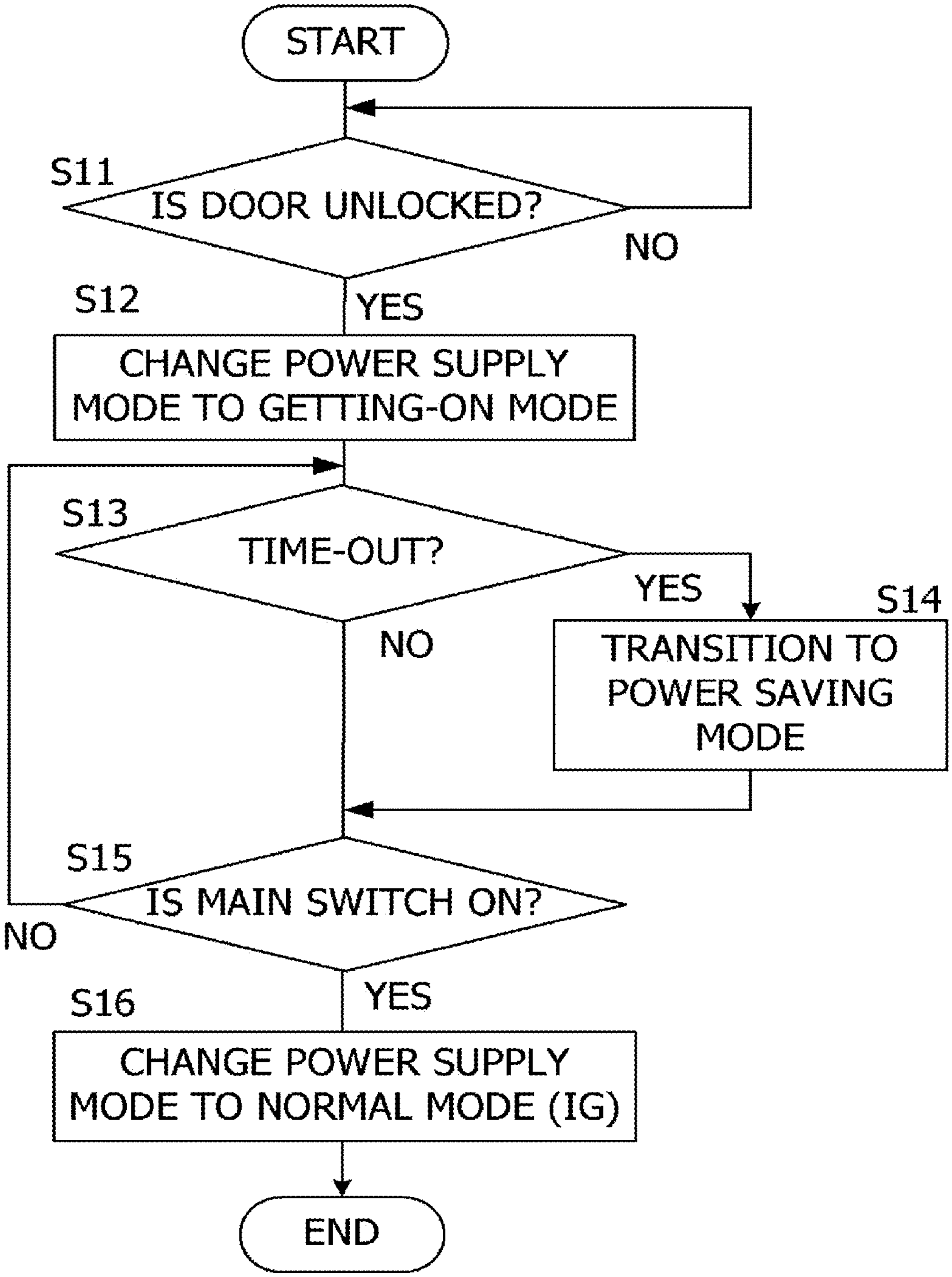

Processing of the in-vehicle device 200 controlling the power supply mode will be described next. FIG. 8 is a flowchart of processing to be executed by the in-vehicle device 200 (power supply management unit 2011). The illustrated processing is started from a state where the vehicle 10 is parked.

It is assumed in the present example that power is supplied to the vehicle components illustrated in FIG. 6 in each power supply mode.

In a case where the vehicle 10 is parked, the power supply mode is the "parking mode". In other words, power is supplied solely to a DRAM for backing up the memory and modules for performing CAN communication.

First, in step S11, it is determined whether or not the door of the vehicle 10 is unlocked. Whether or not the door of the vehicle 10 is unlocked can be determined on the basis of a signal (door open or closed signal) transmitted from the body ECU 300B to the network bus. In a case where the door is not unlocked, the state becomes a standby state, and similar processing is repeated. In a case where the door is unlocked, the processing transitions to step S12.

In step S12, the power supply mode changes to the getting-on mode. By this means, power supply to predetermined vehicle components is started. In the example illustrated in FIG. 6, power supply to the main substrate of the in-vehicle device 200, modules for performing wireless communication and the audio output device is started.

By this means, it is possible to start in advance preparation for wireless connection (for example, connection to the smartphone possessed by the passenger) and starting of the amplifier 206A.

Note that in the present step, the power supply management unit 2011 may instruct the vehicle components to receive power supply from predetermined power lines (power lines through which power is supplied from the battery power supply). Such an embodiment is also included in "power supply".

In step S13, it is determined whether or not the getting-on mode has continued for a predetermined period (for example, 60 seconds) since the power supply mode had been switched to the getting-on mode. In a case where a positive determination result is obtained in the present step, the processing transitions to step S14, and the mode transitions to a power saving mode.

The power saving mode is a mode for reducing power consumption. In a case where the vehicle system is not started even after a predetermined period has elapsed since the power supply mode had been switched to the getting-on mode, it is preferable to stop the started power supply to reduce power consumption of the battery. For example, in a case where the vehicle system is not started within 60 seconds since the door has been open, the power supply of the amplifier 206A may be shut down by instructing the amplifier 206A to perform shutdown.

In step S15, it is determined whether or not the main switch 301 of the vehicle is depressed. Whether or not the main switch 301 of the vehicle is depressed can be determined on the basis of a signal output by the verification ECU 300A. In a case where a positive determination result is obtained in the present step, the processing transitions to step S16. In a case where a negative determination result is obtained, the processing returns to step S13.

In step S16, the power supply mode is changed to the normal mode (IG). By this means, power supply to the image output device, the audio input device and the outside camera is newly started. Power supply to the vehicle components to which power has already been supplied is continued.

Note that there is a case where a mode in which power is supplied solely from the accessory power supply without the engine, or the like, being started can be selected by a depression method of the main switch 301 depending on a type of the vehicle. In such a case, one of the "normal mode (ACC)" and the "normal mode (IG)" just has to be selected in accordance with operation performed by the passenger.

Figure 9:
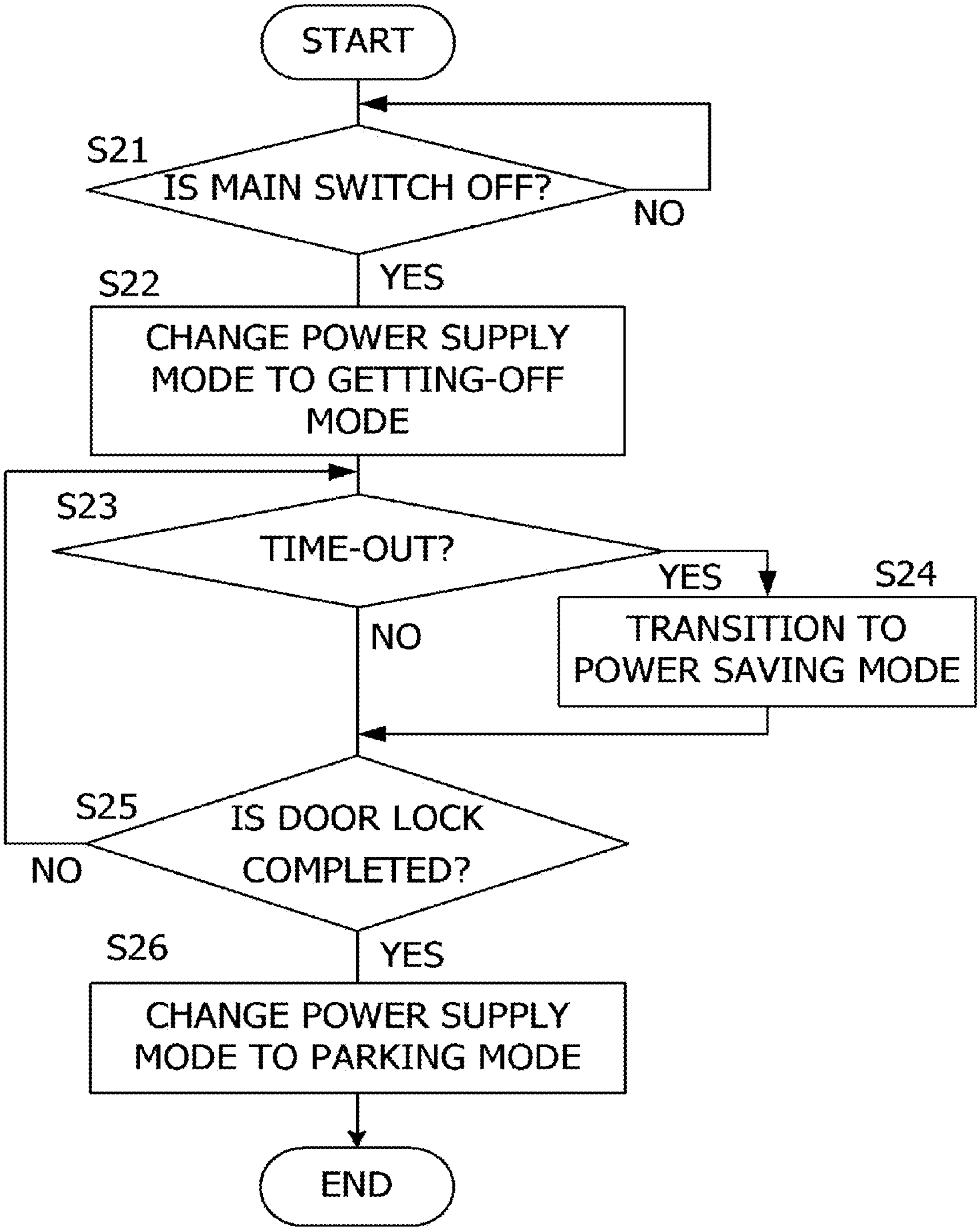
FIG. 9 is a processing flowchart of the in-vehicle device upon getting-off.

Processing to be executed by the in-vehicle device 200 (power supply management unit 2011) in a case where the passenger gets off the vehicle 10 after the vehicle 10 is stopped will be described next with reference to FIG. 9. The illustrated processing is started from a state where the power supply mode is the normal mode (IG) and the vehicle 10 is stopped.

In a case where the power supply mode is the "normal mode (IG)", power is supplied to all the vehicle components illustrated in FIG. 6.

First, in step S21, it is determined whether or not the main switch 301 of the vehicle 10 has been depressed. Whether or not the main switch 301 of the vehicle 10 has been depressed can be determined on the basis of a signal output by the verification ECU 300A.

In a case where the main switch 301 has not been depressed, the state becomes a standby state, and similar processing is repeated. In a case where the main switch 301 has been depressed, the processing transitions to step S22.

While in the vehicle in related art, the power supply mode is changed to the parking mode here, in the present embodiment, the in-vehicle device 200 changes the power supply mode to the getting-off mode in step S22.

By this means, power supply to predetermined components under the control of the in-vehicle device 200 is continued. In the example illustrated in FIG. 6, power supply to the main substrate of the in-vehicle device 200, the modules for wireless communication, the audio output device and the image output device is continued. By this means, both the audio output function and the image output function are put into an available state, so that the getting-off support function can be provided.

The getting-off support function is a function of giving a notification that it is dangerous to open the door (or locking the door) in a case where another vehicle is approaching from behind the vehicle 10. Continuation of power supply to both the audio output device and the image output device enables notification to the passenger using an image or audio. For example, in a case where the passenger tries to open the door in a situation where another vehicle is approaching from behind the vehicle 10, an alarm can be issued using an image and audio. Further, the passenger can be notified of a reason why the door is locked using an image and audio after the door is locked.

In step S23, it is determined whether or not the getting-off mode has continued for a predetermined period (for example, 120 seconds) since the power supply mode has been switched to the getting-off mode. In a case where a positive determination result is obtained in the present step, the processing transitions to step S24, and the mode transitions to the power saving mode.

In a case where the passenger does not get off the vehicle even after a fixed period has elapsed since the power supply mode had been switched to the getting-off mode, it is preferable to stop the started power supply to reduce power consumption of the battery. For example, in a case where the door is not locked within 120 seconds since the main switch 301 of the vehicle has been depressed, power supply to the audio output device and the image output device may be shut down.

In step S25, it is determined whether or not the door of the vehicle has been locked. Whether or not the door of the vehicle has been locked can be determined on the basis of a signal output by the verification ECU 300A. In a case where a positive determination result is obtained in the present step, the processing transitions to step S26. In a case where a negative determination result is obtained, the processing returns to step S23.

In step S26, the in-vehicle device 200 changes the power supply mode to the parking mode. By this means, power supply to vehicle components except minimum requisite vehicle components is stopped.

As described above, the vehicle 10 according to the present embodiment has power supply modes to be utilized upon getting-off and upon getting-on, in addition to the power supply mode (normal mode (IG)) while the vehicle is traveling and the power supply mode (normal mode (ACC)) in which power is supplied solely from the accessory power supply.

This enables power supply to predetermined vehicle components (for example, the audio output device including the amplifier 206A) during a period until when the passenger finishes getting on the vehicle, so that a service can be quickly provided.

Further, this enables power supply to predetermined vehicle components (for example, the audio output device and the image output device) during a period until when the passenger finishes getting off the vehicle, so that safety upon getting-off can be secured.

In related art, the accessory power supply of the vehicle needs to be powered on to provide these functions during getting-on or getting-off. However, if the accessory power supply is powered on, all the vehicle components connected to the corresponding power supply system are activated, which increases power consumption. In contrast, in the present embodiment, power can be supplied solely to minimum requisite vehicle components, so that power consumption can be reduced.

Modification of First Embodiment

While in the first embodiment, it is determined that the passenger gets on the vehicle in a case where the door of the vehicle 10 has been unlocked, getting-on of the passenger to the vehicle may be detected using other methods. For example, the passenger having got on the vehicle or the passenger trying to get on the vehicle may be detected by a sensor, a camera, or the like. Further, in a case where a terminal possessed by the passenger is detected, it may be determined that the passenger tries to get on the vehicle.

Further, while in the first embodiment, the door open or closed signal is utilized as a method for detecting that the passenger has got off the vehicle, getting-off may be detected using other methods. For example, the passenger having got off the vehicle or the passenger trying to get off the vehicle may be detected by a sensor, a camera, or the like. Further, in a case where the door of the vehicle 10 has been locked, it may be determined that the passenger has got off the vehicle.

OTHER EMBODIMENTS

The embodiments described above are examples, and the present disclosure may be changed and carried out as appropriate without departing from the gist of the present disclosure.

The processes and means described in the present disclosure may be freely combined to the extent that no technical conflict exists.

A process which is described to be performed by one device may be performed among a plurality of devices. Processes described to be performed by different devices may be performed by one device. Each function to be implemented by a hardware component (server component) in a computer system may be flexibly changed.

The present disclosure may also be implemented by supplying a computer program for implementing a function described in the embodiment above to a computer, and by reading and executing the program by at least one processor of the computer. Such a computer program may be provided to a computer by a non-transitory computer-readable storage medium which is connectable to a system bus of a computer, or may be provided to a computer through a network. The non-transitory computer-readable storage medium may be any type of disk such as a magnetic disk (floppy (registered trademark) disk, a hard disk drive (HDD), etc.), an optical disk (CD-ROM, DVD disk, Blu-ray disk, etc.), a read only memory (ROM), a random access memory (RAM), an EPROM, an EEPROM, a magnetic card, a flash memory, an optical card, and any type of medium which is suitable for storing electronic instructions.

What is claimed is:

1. An in-vehicle device to be mounted on a vehicle including a wireless communication module for performing wireless communication with a smartphone and an audio output device configured to output audio, the in-vehicle device being a device that provides information to a passenger of the vehicle, wherein the in-vehicle device is configured to supply power to the wireless communication module and to the audio output device during a first period from when a trigger of the passenger getting on the vehicle is detected until when a first operation of powering on a power supply of the vehicle is performed.

2. The in-vehicle device according to claim 1, wherein the first period is started at a timing at which a door of the vehicle is unlocked.

3. The in-vehicle device according to claim 1, wherein in a case where time-out occurs without the first operation being performed after the trigger is detected, a power supply of the audio output device is shut down.

4. The in-vehicle device according to claim 1, wherein the vehicle further includes an image output device configured to output an image, wherein the in-vehicle device is further configured to supply power to the audio output device and to the image output device during a second period from when second operation of shutting down the power supply of the vehicle is performed until when the passenger getting off the vehicle is detected.

5. The in-vehicle device according to claim 1, wherein the vehicle further includes an image output device configured to output an image, wherein the in-vehicle device is further configured to supply power to the wireless communication module, the audio output device, and the image output device during a second period from when second operation of shutting down the power supply of the vehicle is performed until when the passenger getting off the vehicle is detected.

6. The in-vehicle device according to claim 4, wherein the second period is finished at a timing at which a door of the vehicle is open or at a timing at which operation of locking a door of the vehicle is performed.

7. The in-vehicle device according to claim 4, wherein in a case where time-out occurs without getting-off of the passenger being detected after the second operation is performed, power supplies of the audio output device and the image output device are shut down.

8. The in-vehicle device according to claim 4, wherein power is not supplied to the image output device during the first period.

9. The in-vehicle device according to claim 4, further comprising a controller configured to determine that a first vehicle that approaches from behind the vehicle during the second period.

10. The in-vehicle device according to claim 9, wherein the controller is configured to output an alarm via the audio output device or the image output device when determined that the first vehicle that approaches from behind.

11. A control method for controlling a power supply of a vehicle including a wireless communication module for performing wireless communication with a smartphone and an audio output device configured to output audio, the control method comprising:

supplying power to the wireless communication module and to the audio output device during a first period from when a trigger of a passenger getting on the vehicle is detected until when a first operation of powering on the power supply of the vehicle is performed.

12. The control method according to claim 11, wherein the first period is started at a timing at which a door of the vehicle is unlocked.

13. The control method according to claim 11, wherein in a case where time-out occurs without the first operation being performed after the trigger is detected, a power supply of the audio output device is shut down.

14. The control method according to claim 11, wherein the vehicle further includes an image output device configured to output an image, wherein the control method further comprises supplying power to the audio output device and to the image output device during a second period from when a second operation of shutting down the power supply of the vehicle is performed until when the passenger getting off the vehicle is detected.

15. The control method according to claim 11, wherein the vehicle further includes an image output device configured to output an image, wherein the control method further comprising supplying power to the wireless communication module, the audio output device, and the image output device during a second period from when a second operation of shutting down the power supply of the vehicle is performed until when the passenger getting off the vehicle is detected.

16. The control method according to claim 14, wherein in a case where time-out occurs without getting-off of the passenger being detected after the second operation is performed, power supplies of the audio output device and the image output device are shut down.

17. The control method according to claim 14, wherein power is not supplied to the image output device during the first period.

18. The control method according to claim 14, further comprising determining that a first vehicle that approaches from behind the vehicle during the second period.

19. The control method according to claim 18, further comprising outputting an alarm via the audio output device or the image output device when determined that the first vehicle that approaches from behind.

20. A non-transitory computer-readable recording medium recorded with a program for causing a computer to execute a control method for controlling a power supply of a vehicle including a wireless communication module for performing wireless communication with a smartphone and an audio output device configured to output audio, wherein the control method comprises supplying power to the wireless communication module and to the audio output device during a first period from when a trigger of a passenger getting on the vehicle is detected until when first operation of powering on the power supply of the vehicle is performed.

* * * * *